United States Patent

Larkin

[15] 3,673,348

[45] June 27, 1972

[54] VIDEO TAPE PICK-UP AND GUIDE SYSTEM FOR CARTRIDGE TYPE REPRODUCING AND/OR RECORDING SYSTEM

[72] Inventor: Thomas J. Larkin, San Jose, Calif.

[73] Assignee: Cartridge Television, Inc., New York, N.Y.

[22] Filed: June 26, 1970

[21] Appl. No.: 50,058

[52] U.S. Cl. ..................179/100.2 Z, 179/100.2 T, 226/195

[51] Int. Cl.......................................G11b 5/52, G11b 23/06

[58] Field of Search..............................179/100.2 T, 100.2 Z; 242/55.11, 55.12, 55.13, 55.16; 226/86, 195; 274/4 B, 4 C, 11 B, 11 C, 11 D

[56] References Cited

UNITED STATES PATENTS

| | | | |
|---|---|---|---|
| 3,516,146 | 6/1970 | Maxey | 179/100.2 T |
| 3,404,241 | 8/1968 | Streets | 179/100.2 T |
| 3,107,279 | 10/1963 | Hanes et al. | 179/100.2 Z |
| 3,083,925 | 4/1963 | Schoebel | 179/100.2 Z |

FOREIGN PATENTS OR APPLICATIONS

| | | | |
|---|---|---|---|
| 1,537,240 | 10/1969 | Germany | 179/100.2 T |

OTHER PUBLICATIONS

IBM Tech. Disc Bulletin, Vol. 9, No. 8, p. 968, Jan. 1967, " Automatic Tape Threading," Johnson et al.

*Primary Examiner*—Howard W. Britton
*Assistant Examiner*—Jay P. Lucas
*Attorney*—Townsend and Townsend

[57] ABSTRACT

A tape guide and pick-up system for a tape transport of the type having a rotary head assembly. The guide and pick-up system is adapted to be used with a tape cartridge from which a stretch of tape is removed and advanced into a position adjacent to the paths of travel of a rotary head of the head assembly to permit the head to scan the tape stretch as the latter moves relative to the assembly. The guide system includes a number of spaced guides which orient the tape in a manner to cause it to be presented to the head assembly at a helical angle, whereby the tape tracks scanned by the heads will be oblique relative to the longitudinal axis of the tape stretch. The cartridge has an improved brake operated by control means forming a part of the tape transport to cause the tape reels in the cartridge to stop quickly after a tape rewind or fast-forward operation.

10 Claims, 11 Drawing Figures

INVENTOR.
THOMAS J. LARKIN
BY Townsend and Townsend
ATTORNEYS

INVENTOR
THOMAS J. LARKIN
BY Townsend and Townsend
ATTORNEYS

Patented June 27, 1972 3,673,348

5 Sheets-Sheet 5

INVENTOR.
THOMAS J. LARKIN
BY Townsend and Townsend
ATTORNEYS

INVENTOR
THOMAS J. LARKIN

BY Townsend and Townsend
ATTORNEYS

INVENTOR.
THOMAS J. LARKIN

BY Townsend and Townsend

ATTORNEYS

VIDEO TAPE PICK-UP AND GUIDE SYSTEM FOR CARTRIDGE TYPE REPRODUCING AND/OR RECORDING SYSTEM

This invention relates to improvements in tape transport systems of the rotary head type and, more particularly, to an improved apparatus for guiding the tape stretch as it extends outwardly from a tape supply means and along at least a portion of the arcuate path of travel of one or more rotary heads.

In utilizing one or more rotary heads with a tape transport, each head is caused to move at a relatively high rotational speed along a rotary path which is adjacent to an arcuate stretch of a magnetic tape moving at a relatively low rectilinear speed. The tape is generally canted at a helical angle with respect to the head path to cause the head to scan the tape along tracks which are parallel to each other and oblique relative to the longitudinal axis of the tape. In this way, the working surface of the tape is most effectively utilized. Thus, for tape having a width of one-half inch, a record track on the tape can be as long as 10 inches, a length which, at the particular speeds of the heads and the tape, allows the record track to correspond in time to one field of a video image frame. Thus, a particular video field can either be recorded on the tape or played back therefrom when a single head scans a record track.

Generally, tape transport systems using a rotary head assembly have a reel-to-reel type of tape arrangement with the reels being rotatably mounted at fixed locations on the tape deck of the system. The tape guides which position the tape along the rotary head assembly are also at fixed locations on the deck and the tape is manually fed from one reel and around the head assembly to the other reel to position the tape for scanning by the heads. Since the reels and guides are at fixed locations relative to the head assembly, there are substantially no head-to-tape registry problems due to interchangeability of tapes.

If, however, a tape cartridge is used with the rotary head assembly, interchangeability becomes a problem if it is desired that means be provided with a tape transport to pull a stretch of tape out of the cartridge to present the tape to heads for scanning thereby. Not only must the tape be at the proper helical angle each time it is moved adjacent to the head assembly, but also the tape must be properly picked up guided toward the assembly from the cartridge and properly guided for return to the cartridge after passing by the assembly. Furthermore, if the cartridge is a reel-over-reel type, the tape must be oriented so that it can move out of the cartridge at one level and move into the cartridge at another level. All of these requirements must be satisfied to permit the interchange of tape cartridges with a particular tape transport.

To meet the foregoing requirements, it is necessary to provide a guide and pick-up system for a tape transport which can perform the following steps:

1. Pull a stretch of tape out of a tape cartridge and move it toward the rotary head assembly.
2. Position the tape stretch adjacent to the head assembly so that the tape stretch is at a helical angle relative to the head paths.
3. If a reel-over-reel cartridge is used, orient the tape so that it moves out of the cartridge at one level and returns to the cartridge at another level.

The present invention is directed to an improved guide and pick-up system for a tape transport wherein the system operates to perform the above steps each time a tape cartridge is used with the tape transport. Thus, cartridges can be interchanges and the tapes from the various cartridges will at all times be properly positioned with respect to the head assembly of the tape transport for scanning by the heads thereof.

To achieve the foregoing, the guide system of this invention includes a first pair of pick-up elements or guides which are carried by movable arms and operate to move the tape out of the cartridge as the arms move along respective paths relative to and away from the cartridge itself. These first guides orient the tape in a manner such that the upstream and downstream ends of the tape stretch adjacent to the head assembly will both be at the proper helical angle relative to the head paths. Moreover, these first guides maintain the angle throughout the working arc of the tape notwithstanding the fact that the tape must partially encircle the head assembly itself.

Swingable auxiliary guide means and fixed auxiliary guide means are provided for each of the first guides, respectively, for guiding the tape toward and away from the first guides when the latter are adjacent to the head assembly while, at the same time, assuring there will be no transverse drift of the tape which results in a "barber pole" effect of the tape with respect to the first guides and which would otherwise destroy the helical relationship between the tape and the head paths. The additional guide means is configured to twist the tape at certain locations to guide the tape properly onto a respective first guide and to compensate for the fact that the tape entries to the cartridge are at two different levels with respect to the deck of the tape transport.

Another aspect of the invention is an improved brake means utilized with a reel-over-reel cartridge wherein the reels of the cartridge can be suddenly stopped to prevent overrunning of the reels during a fast-forward or a rewind operation. To this end, the cartridge has a brake unit therein which is normally in frictional engagement with the flanges of the tape reels but which is moved away therefrom when the cartridge is placed in an operative position on the deck of the tape transport. Means is provided for shifting the brake unit toward the reel flanges at the end of each fast-forward or rewind operation so that the brake unit will frictionally engage the reel flanges to stop the rotation of the reels. When the cartridge is removed from the transport deck, the brake unit again frictionally engages the reel flanges to prevent rotation of the reels. Thus, the tape is held under tension along the open extremity of the cartridge from which the tape is removed.

The primary object of this invention is to provide an improved pick-up and guide system for a tape transport of the type having a rotary head assembly wherein the guide system operates to guide a tape into a position at which the tape makes a particular helical angle with the head paths to assure the proper scanning of the tape by the heads along oblique tracks and to allow for interchangeability of tapes without any appreciable variations in the helical angle itself.

Another object of this invention is to provide a tape transport having a pick-up and guide system of the type described wherein the transport can be utilized with a tape cartridge to allow for interchangeability of cartridges and also to permit the cartridges to be of the reel-over-reel type.

Still another object of this invention is to provide an improved tape pick-up and guide system of the type described which prevents tape drift when the tape is in a record or playback mode, provides a means for drawing tape out of a reel-over-reel cartridge having two tape elevations with respect to the transport deck and efficiently guides the tape toward the rotary head assembly as the tape is being pulled out of the cartridge.

Another object of this invention is to provide an improved brake unit for a reel-over-reel tape cartridge wherein the brake unit operates to stop the rotation of the tape reels immediately after the end of a fast-forward or rewind mode to thereby prevent overrunning of the tape in the cartridge itself and to maintain tension on the tape stretch extending between the reels.

Other objects of this invention will become apparent as the following specification progresses, reference being had to the accompanying drawings for an illustration of the invention.

Figure 9:
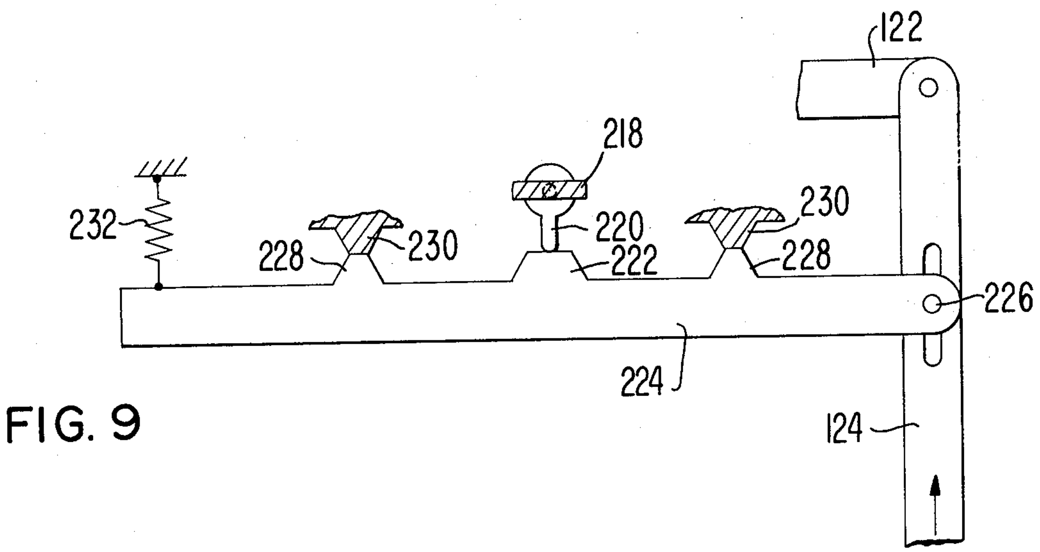
FIG. 9 is a schematic view of the brake unit for stopping the rotation of the reels in the cartridge and showing the relative positions of the brake unit and its control means during a record or playback mode.
Figures 9A, 9B:
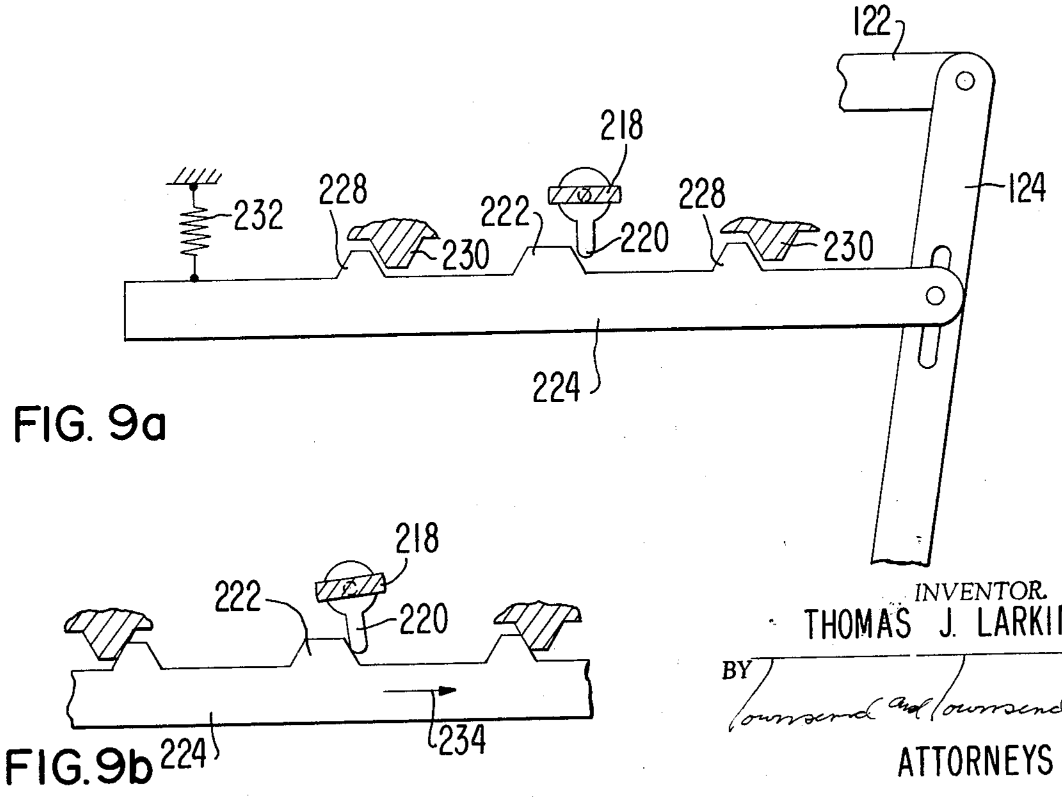

FIG. 9*a* is a view similar to FIG. 9 but showing the brake unit and its control means during a fast-forward or rewind mode; and FIG. 9*b* is a fragmentary view similar to FIGS. 9 and 9*a* but showing the brake unit at the end of a fast-forward or rewind mode.

Figure 1:
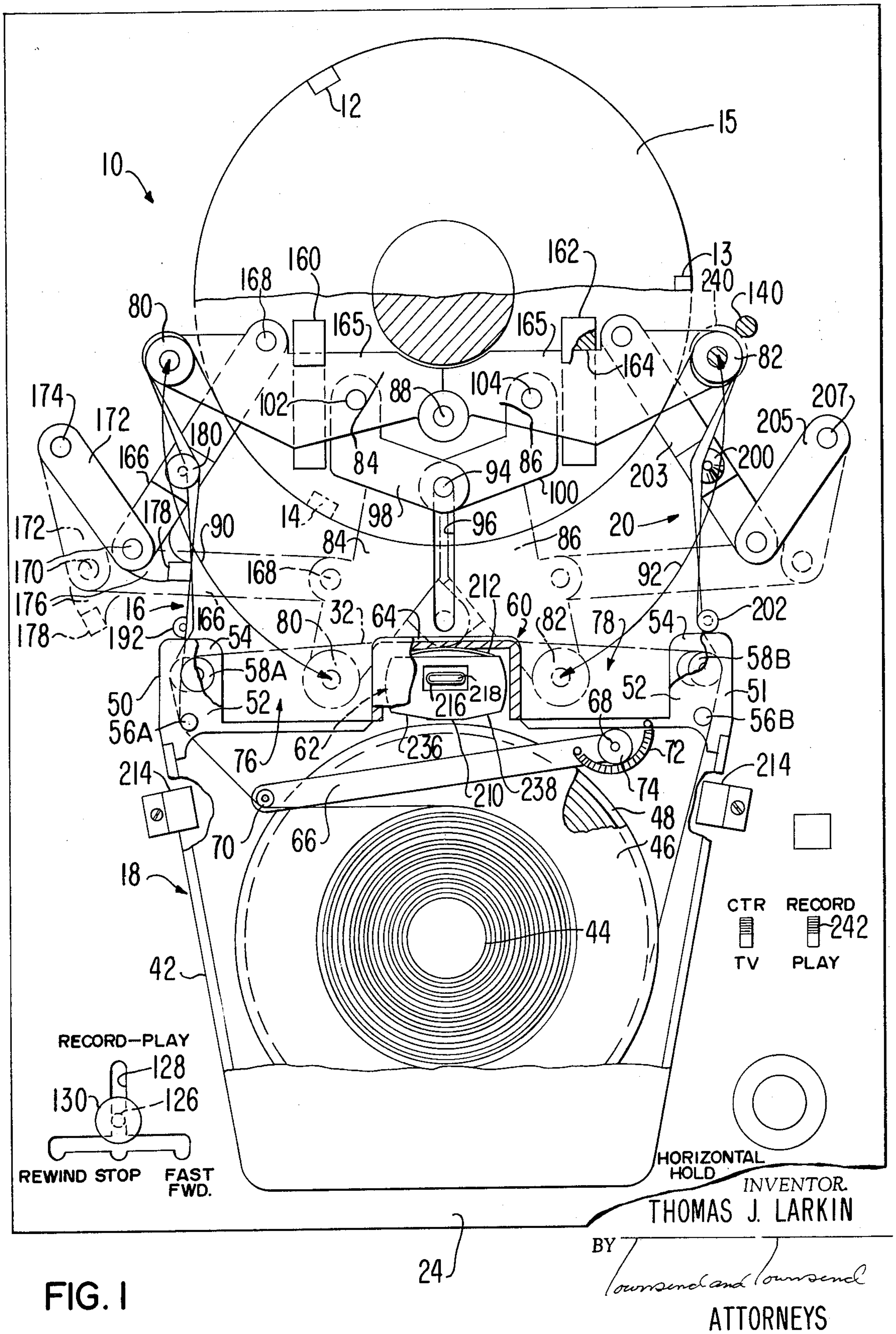
FIG. 1 is a front elevational view of a portion of a tape transport system of the rotary head type and a tape cartridge having a tape extending outwardly from the cartridge and being presented by the pick-up and guide means of the invention to the heads of the system.

The present invention is directed to a tape transport system 10 of the type having a rotary head assembly including a number of spaced read-write heads 12, 13 and 14 mounted on a rotor 15 for rotation about a central axis. System 10 is adapted for use as a tape recorder or reproducer wherein heads 12, 13 and 14 obliquely scan a magnetic tape 16 as the heads rotate with the rotor and as the tape moves in a predetermined direction along a portion of the outer periphery of the rotor. The tape is carried in a tape cartridge 18 positioned at a location spaced from the rotor as shown in FIG. 1. For purposes of illustration, the cartridge is of the reel-over-reel type and has recess means near one end margin which permits the tape to be drawn outwardly of the cartridge and positioned along the path of the heads.

Heads 12, 13 and 14 are disposed in generally parallel planes and arranged so that all three heads scan the same track of the tape for each revolution of rotor 15. Thus, assembly 10 is adapted to provide the advantages of the skip-field technique wherein only selected fields of successive video image frames are recorded on the tape and the recorded fields are played back a number of times to provide a video image of acceptable quality notwithstanding the significant decrease in the information recorded from the original video signal. The skip-field technique is utilized with transport system 10 by presenting the tape to the rotary head assembly at a helical angle known as the helix angle whereby the heads scan the tape along oblique tracks during recording and playback. The guide system of this invention, broadly denoted by the numeral 20, is provided to assure that the tape is positioned adjacent to the rotary head assembly at the same helix angle each time the tape is moved out of the cartridge. Thus, there is complete interchangeability of tapes and cartridges for use with transport system 10.

Figure 4:
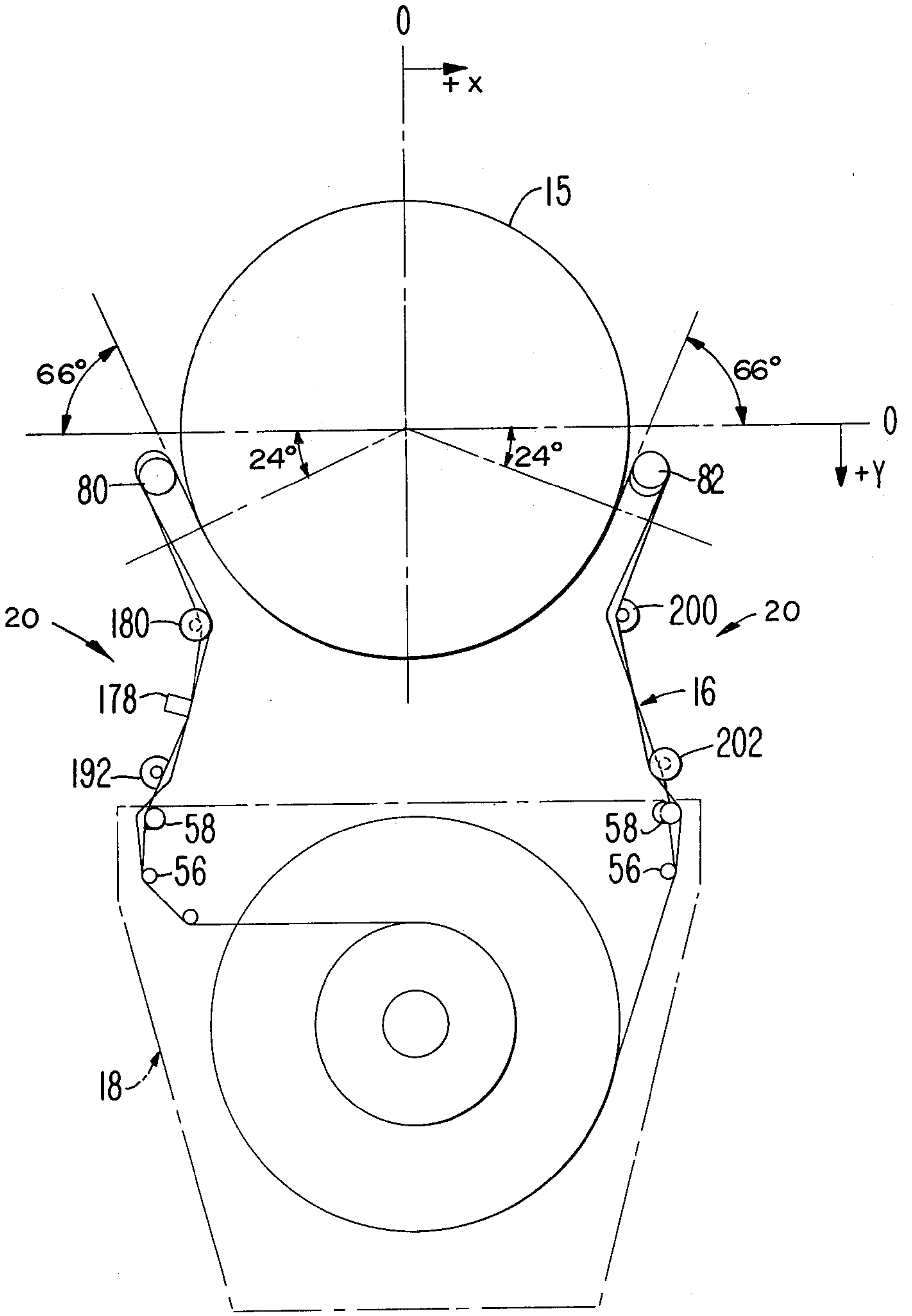
FIG. 4 is a schematic view of the guide system of the invention for the record or playback condition of the tape after it has been pulled out of the cartridge and placed adjacent to the rotary head assembly.
Figure 5:
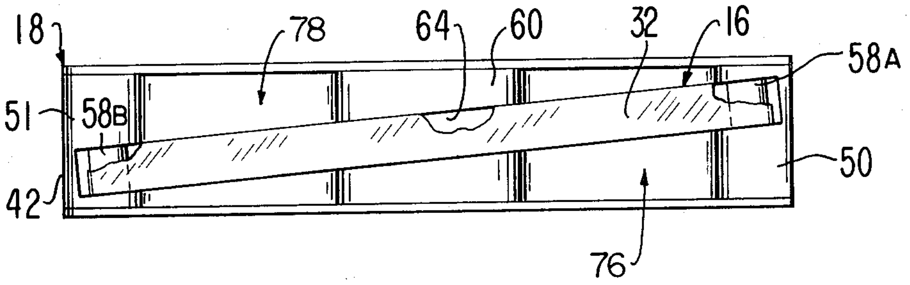
FIG. 5 is an end elevational view of the cartridge showing the angled tape stretch to be drawn out of the cartridge and moved adjacent to the rotary head assembly.

Guide system 20 is shown schematically in FIG. 4 in its operative position between rotor 15 and cartridge 18. In this position, the guide system orients the tape so that a working stretch of the tape extends at a helix or helical angle along a portion of the outer periphery of rotor 15. Thus, the heads attached to the rotor will scan the adjacent tape obliquely relative to its longitudinal axis.

The guide system includes guides 80, 180 and 192 on the left-hand side of the system and guides 82, 200 and 202 on the right-hand side of the system (FIG. 4). Guides 80 and 82 are pick-up guides of cylindrical shape and are canted in directions to allow the tape stretch to make 180° loops about the guides and to merge smoothly with the head assembly at the helix angle. Pick-up element 80 is canted to the right (FIG. 1) and also in the direction of travel of tape departing therefrom. Pick-up element 82 is canted to the right (i.e. away from the rotary assembly) and also in the direction of travel of the tape arriving thereat. Guides 180, 192, 200 and 202 have conical surfaces which are described in more detail hereinafter. These conical guides orient the tape so that the latter approaches guide 80 and extends away from guide 82 in a manner to assure the helix angle will be maintained. They also guide the tape as it is pulled out of the cartridge and moved toward the rotor. They also prevent tape drift axially of guides 80 and 82 and compensate for the difference in levels between the reels of the cartridge.

Rotor 15 is mounted on a suitable shaft 22 (FIG. 3) for rotation relative to a base plate 24 which is stationary and which supports in any suitable manner the drive motor 26 of which shaft 22 forms a part. For purposes of illustration, shaft 22 will be described as being horizontal; thus, heads 12, 13 and 14 will rotate in generally vertical planes and will be disposed above the normal position of cartridge 18. Guide system 20 will, therefore, pull a span of tape out of the cartridge and elevate the span so that it will be adjacent to the lower peripheral margin of the rotary head assembly. It is clear that shaft 22 can be vertically disposed so that heads 12, 13 and 14 are rotatable in generally horizontal planes.

Figure 3:
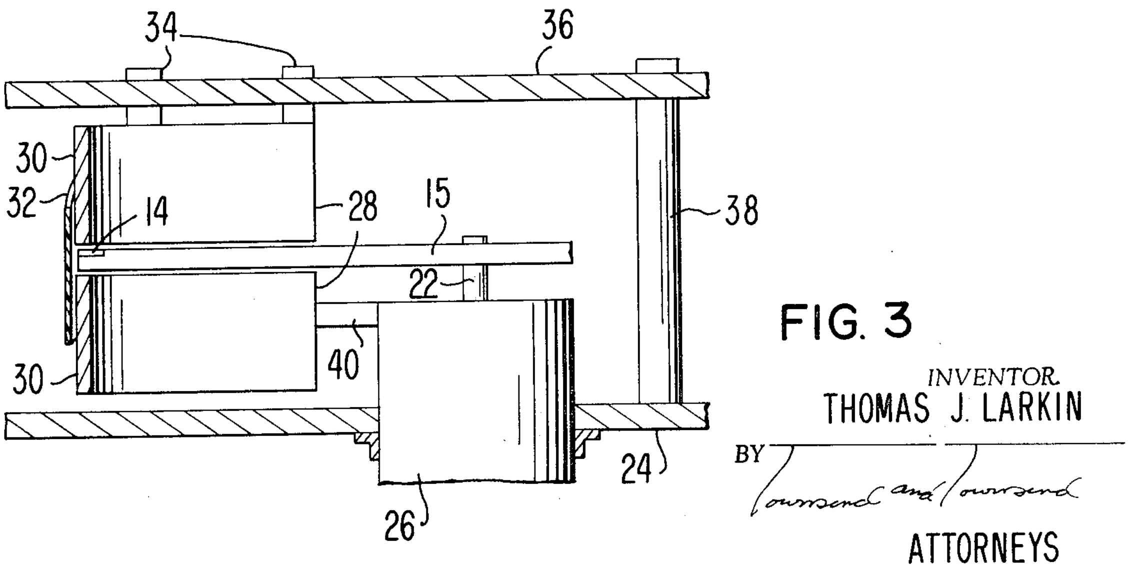
FIG. 3 is a fragmentary, cross-sectional view of the rotary head assembly and the means for contouring the tape for scanning thereof by the heads.

Means is provided adjacent to the rotary head assembly for contouring the tape along the aforesaid arcuate portion of the path of travel of each head. To this end, a pair of arcuate, generally rigid contour members 28 are disposed on opposite sides of rotor 15 as shown in FIG. 3. Members 28 and 15 constitute a rotary transducer mount. Each member is a segment of a cylinder and has its axis coincident with that of the other member and coincident with the axis of rotation of the rotor. Each member 28 has an outer, tape-engaging surface 30 which serves to contour the tape or cause it to be in registry with the heads as the latter rotate relative to base plate 24. Members 28 are spaced apart to accommodate rotor 15 therebetween. A stretch 32 of the tape is shown in FIG. 3 in face to face engagement with surfaces 30.

Members 28 can be fixedly supported in any suitable manner. For purposes of illustration, the outer member is secured by suitable fasteners 34 to an outer plate 36 secured by a connector 38 to base plate 24. The other member 28 is secured by a link 40 to the housing of motor 26. Thus, both members 28 are rigidly secured in place.

Cartridge 18 includes a closed housing 42 (FIG. 1) which contains a pair of tape reels which are in axial alignment with each other and on the hubs of which tape 16 is wound. One of the reels is shown in FIG. 1 and includes a hub 44 provided with a flange 46 thereon. The other reel has a hub (not shown) provided with a flange 48. Each reel can have only a single flange or can have two parallel flanges if such is desired. However, a single flange will reduce the thickness requirements of cartridge 18.

Housing 42 has a pair of end projections 50 and 51 adjacent to the normally uppermost margin thereof. Each projection includes an outer section 52 and an inner section 54 which are spaced apart and between which tape 16 passes. A first, cylindrical tape stretch guide 56A spans the distance between sections 52 and 54 and has an axis substantially parallel with the common axis of the two reels. A second cylindrical guide 58A also spans the distance between sections 52 and 54; guide 58A is spaced from guide 56A and is canted to the right when viewing FIG. 1. Thus, guides 58A and 58B of projections 50 and 51, respectively, will orient the central tape stretch 32 at an angle with respect to the planes of rotation of the two reels. Guides 56B and 58B on the right side of the cartridge are alike in construction to guides 56A and 58A on the left side (FIG. 1). Tape stretch guide 58B is also canted to the right, when viewing FIG. 1.

A central projection 60 is provided on housing 42 and presents a hollow space for a brake unit 62 which engages the outer peripheries of flanges 46 and 48 to stop the rotation of the corresponding reels. The upper face of projection 60 is provided with a groove 64 (FIG. 1) for receiving the adjacent portion of tape stretch 32. The groove is angled with respect to the planes of rotation of the reels in housing 42.

A tension arm 66 is disposed within housing 42 for tensioning tape 16. One end of arm 66 is pivotally mounted by a pin 68 to housing 42 and the opposite end of the arm has a bearing element 70 projecting laterally from arm 66 for engaging the tape. A coil spring 72 is secured at one end to arm 66 and at the opposite end to housing 42. The spring is partially wrapped about a base 74 to which pin 68 is secured to provide a predetermined bias force exerted on arm 66 to bias it in a counterclockwise sense when viewing FIG. 1.

Thus, tape 16 extends outwardly from one reel, past bearing element 70, around guides 56A and 58A of projection 50, past projection 60 within groove 64, around guides 58B and 56B of projection 51 and then onto the second reel.

The spaces between projections 50, 51 and 60 define a pair of recesses 76 and 78 for receiving a pair of cylindrical tape guides pick-up elements 80 and 82, respectively, such guides pick-up elements forming a part of guide system 20. Pick-up elements 80 and 82 are operable to pull tape stretch 32 outwardly of housing 42 and adjacent to the rotary head assembly. Pick-up elements 80 and 82 are rotatably mounted on respective ends of a pair of arms 84 and 86, respectively, the arms being shown in full lines in FIG. 1 in the operative positions thereof wherein elements 80 and 82 are positioned adjacent to the rotary head assembly. Arms 84 and 86 are positioned between base plate 24 and rotor 15 for rotation about a pin 88 secured to and extending outwardly from the base plate 24.

Arms 84 and 86 are moved simultaneously about pin 88 along respectively arcuate paths represented by the arcuate arrows 90 and 92, respectively. The movement of the arms is effected by the movement of a pin 94 through a slot 96 in base plate 24. Pin 94 is pivotally coupled to a pair of legs 98 and 100 which are pivotally connected by pins 102 and 104 to respective arms 84 and 86. As pin 94 moves in slot 96, it carries legs 98 and 100 with it to, in turn, move arms 84 and 86 along the arcuate paths indicated by arrows 90 and 92.

The apparatus for moving pin 94 includes a disk 106 (FIG. 2) disposed on the side of base plate 24 opposite to the side near rotor 15. Pin 94 is connected to a link 108, pivotally connected by a pin 110 to disk 106, pin 110 being spaced radially from the stub shaft 112 which mounts disk 106 for rotation relative to the base plate. A ring gear 114 is connected to disk 106 for rotation therewith. The ring gear meshes with a spur gear 116 carried by an arm 118 when the arm is moved toward the ring gear against the bias force of a spring 120. To effect this movement of arm 118, the arm is rigidly connected at one end thereof to a first control lever 122 which is pivotally mounted by a pin 123 on base plate 24. A second control lever 124 is pivotally connected at one end thereof to the proximal end of control lever 122. The opposite end of lever 124 has a laterally extending shaft 126 (FIG. 1) which extends through an inverted T-shaped slot 128 and connects with a control knob 130, whereby control lever 124 can be manually moved in directions corresponding to the configuration of slot 128.

Figure 7:
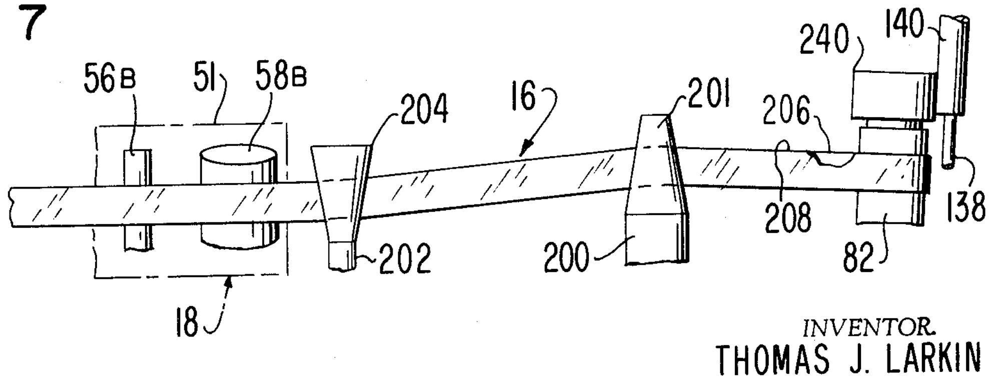
FIG. 7 is a view of the right-hand part of the tape guide system of FIG. 1 showing the tape extending outwardly from the cartridge and being oriented in a particular manner by the pick-up and guide system.

Spur gear 116 is coupled to a belt and pulley assembly (FIG. 2) including a first pulley 132 to which the spur gear is rigidly connected, an endless, flexible belt 134, and a second pulley 136 carried by a shaft 138 to which a capstan 140 (FIGS. 1 and 7) is connected, the capstan being on the side of base plate 24 opposite to the side having pulley 136. A flywheel 142 is mounted on shaft 138 to provide the proper inertial effects for the capstan.

Flywheel 142 forms a part of a second belt and pulley assembly which includes an endless, flexible belt 144 and a pulley 146 connected to the shaft 148 of a drive motor 150 of the hysteresis type. Motor 150, therefore, operates to rotate capstan 140 as well as to drive arms 84 and 86 from the dashed line positions of FIG. 1 to the full line positions thereof and return.

Disk 106 (FIG. 2) rotates through a half revolution as arms 84 and 86 move from the dashed line positions to the full line positions. Similarly, the disk rotates another half revolution when the arms return to their dash line positions. To assure only a half revolution movement of disk 106, the disk is provided with a pair of recesses 152 and 154 which are diametrically opposed with respect to each other and are adapted to complementally receive a roller 156 rotatably mounted at the opposite end of first control lever 122. Thus, when control lever 124 moves in the direction of arrow 158, i.e., when control knob 130 moves upwardly in slot 128, roller 156 will move out of recess 152 and spur gear 116 will move into meshing relationship with ring gear 114. Thus, disk 106 will be rotated to cause pin 94 to be moved from the lowermost position in slot 96 to the position shown in FIGS. 1 and 2. However, knob 130 will only be momentarily forced upwardly in slot 128, whereupon spring 120 will tend to bias arm 118 in a clockwise sense, tending to move second control lever 124 downwardly or in the opposite direction of arrow 158. Spur gear 116 remains in mesh with ring gear 114 because roller 156 will be in rolling engagement with the outer periphery of disk 106 until the roller moves into registry with recess 154. When this occurs, the roller moves into this recess and spur gear 116 moves out of meshing relationship with ring gear 114. The foregoing illustrates how the movement of pin 94 in slot 96 is achieved by a half revolution of disk 106.

Recess 152 is deeper than recess 154 so that, when roller 156 is in recess 152, shaft 126 (FIG. 1) on the lower end of second control lever 124 will be at the bottom of the vertical portion of slot 128, thus allowing shaft 126 to go either to the left or to the right in the horizontal portion of slot 128. The left-hand part of the lower portion of the slot corresponds to the tape rewind condition. The right-hand part of the slot corresponds to the fast forward condition of the tape. Rewind and fast forward speeds are effected by reel drive means (not shown) supported by base plate 24 and forming a part of tape transport system 10. Such reel drive means includes respective spindles which propel outwardly from base plate 24 and become coupled with the reel hubs as the cartridge is moved into the operative position shown in FIG. 1. One of the spindles will rotate the tape take-up reel during record or replay as the supply reel rotates when the tape is pulled off the same. The supply reel is rotated by its spindle during a rewind operation.

The shallowness of recess 154 of disk 106 (FIG. 2) assures that shaft 126 will remain in the vertical portion of slot 128 when the tape is adjacent to the rotary head assembly. Thus, the tape cannot be rewound or moved forwardly at a high rate when it is in this operative position. It can only be rewound and moved forwardly at a high rate when it has been returned to the cartridge.

As arms 84 and 86 move into the full line positions of FIG. 1, they move into locks 160 and 162 secured to the base plate, each lock having a V-shaped notch 164 (FIG. 1) which receives a knife edge portion 165 on the corresponding arm. This assures that arms 84 and 86 will not move toward and away from the base plate and thereby maintain guides 80 and 82 properly positioned relative to the rotary head assembly.

Arm 84 has a first link 166 pivotally connected thereto by a pin 168. The outer end of link 166 is pivotally connected by a pin 170 to a second link 172 pivotally connected by a pin 174 to the base plate. A projection 176 is carried by link 166 near pin 170 for supporting an erase head 178. This head moves into a position adjacent to tape 16 when arm 84 moves into the full line position of FIG. 1.

Figure 6:
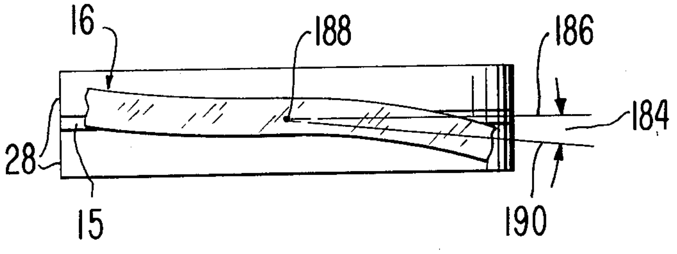
FIG. 6 is a front elevational view of the contouring means of the transport system showing the helix angle at which the tape is oriented adjacent to the heads.

First link 166 swingably carries a conical auxiliary guide 180 thereon intermediate the ends thereof. This guide has a conical surface 182 (FIG. 8) which has its apex end below its base end. Guide 180 moves into a predetermined position with respect to guide 80 when arm 84 is in its operative position so as to properly orient the tape to assume the helix angle adjacent to the rotary head assembly. This helix angle is denoted by the numeral 184 and is illustrated in FIG. 6. It is the angle formed between a horizontal line 186 passing through a particular point 188 on the center line of the tape and a line 190 which also passes through point 188 and is tangential to the direction in which the tape is traveling at the particular point 188.

A second auxiliary conical guide 192 (FIGS. 1 and 8) is fixed to base plate 24 adjacent to projection 50 of cartridge 18. Guide 192 has a conical surface 194 whose apex end points away from base plate 24 and is opposite to that of guide 180. Thus, the left-hand portion of guide system 20, as viewed in FIG. 1, includes guides 80, 180 and 192. These three guides cooperate with guides 56A and 58A in projection 50 of the cartridge so as to orient the tape at the entrance end of the tape scanning region so that the tape will be properly positioned to achieve the helix angle 184 (FIG. 6).

Figure 8:
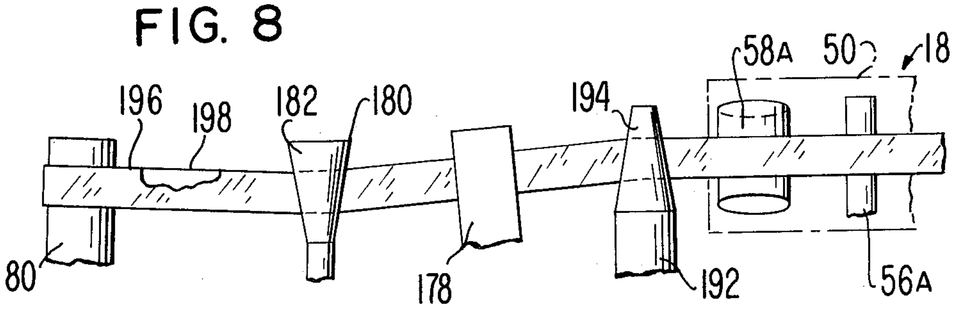
FIG. 8 is a view similar to FIG. 6 but showing the left-hand part of the pick-up and guide system of FIG. 1.

Guide 58A slightly twists the tape to the right when viewing FIG. 1 so that it can be properly aligned with the apex up conical surface 194 of guide 192, this fixed auxiliary guide serving to slant the tape toward base plate 24 in the manner shown in FIG. 8. The tape then passes by erase head 178 and then moves about a portion of the apex down conical surface 182 of guide 180. This swingable auxiliary guide slants the tape away from the base plate so that the outer edge 196 of the tape immediately to the left of guide 80 will be in the same plane relative to the base plate as the corresponding edge 198 of the tape on the right-hand side of guide 80. In other words, the tape portions which are tangent to element 80 are aligned; tape portions which are tangent to element 82 are also aligned. Thus, there will be no "barber pole" effect of the tape along guide 80. Also, the tape will move onto the rotary head assembly at the proper helix angle.

The right-hand portion of guide system 20 includes pick-up element or guide 82, a swingable conical auxiliary guide 200 (FIG. 7) having an apex up conical guide surface 201, and a second and fixed auxiliary conical guide 202 having an apex down conical guide surface 204. Guide 200 is swingably carried by a link 203 pivotally connected to arm 86 and to a second link 205 pivotally connected by a pin 207 to base plate 24. Links 203 and 205 are the counterparts of links 166 and 172 on the left-hand side of the rotary head assembly. The two link assemblies are symmetrical with each other in all respects. Guide 202 is fixed to base plate 24 in the same manner as guide 192. The apex ends of guide surfaces 201 and 204 are opposite to each other. Also, the tape moving onto guide 82 from the rotary head assembly has an upper edge 206 which is in the same plane as the corresponding upper edge 208 on the opposite side of guide 82. This will assure that there will be no "barber pole" effect of the tape along guide 82.

Guide 200 operates to assure that the tape is inclined relative to the base plate to assure the coplanar relationship between tape edges 206 and 208. Guide 200 causes the returning tape to incline toward plate 24 and to approach guide 202 at the proper angle so that the tape will be slightly twisted in the manner shown in FIG. 1. Guide 202 then further orients the tape so that it can approach guide 58B in projection 51 of the cartridge to provide a straight-in approach of the tape past guide 56B and onto the take up reel in the cartridge.

The main function of guide system 20 is to achieve the proper helix angle for a given tape speed, a given rotor speed, a given rotor diameter, and a given angular spacing between each pair of adjacent heads of the rotary head assembly. Other functions of the guide system include the prevention of tape drift relative to the paths of travel of the rotary heads, compensation for the fact that the reels in the cartridge are at two different elevations with respect to the base plate, and guiding the tape span while pulling it out of the cartridge and toward the rotary head assembly.

Brake unit 62 includes a member having a first braking surface 210 for normally engaging the outer peripheries of flanges 46 and 48 of the two reels in the cartridge when tape stretch 32 is retracted into the cartridge. A leaf spring 212 biases surface 210 into frictional engagement with these flanges to thereby inhibit movement of the reels in the cartridge.

When the cartridge is placed on the base plate, a pair of spring holding devices 214 (FIG. 1) releasably engage the cartridge to retain it in the proper operative position. Also, the brake unit has a slot 216 which complementally receives a bar 218 (FIGS. 1 and 9) pivotally carried on base plate 24 and rotatable about an axis substantially parallel with the common axis of the two reels. When bar 218 is received in slot 216, it forces brake unit 62 away from the reel flanges to the position of FIG. 1, thereby releasing the reels for rotation in the cartridge. Also, brake unit 62 can rotate either to the right or to the left in projection 60 under the influence of bar 218.

Figure 2:
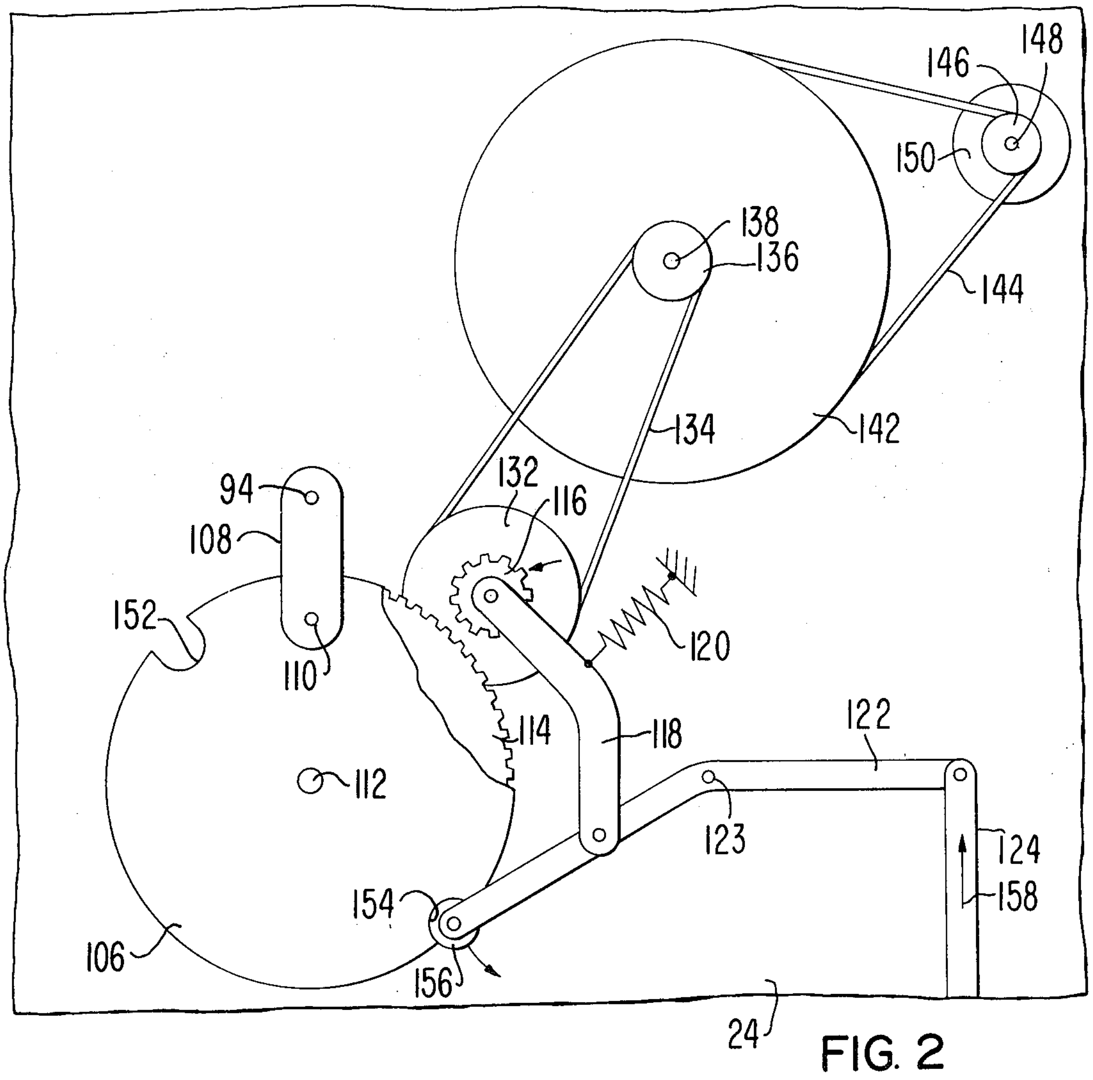
FIG. 2 is a fragmentary, bottom plan view of the tape transport system showing a portion of the structure for moving the tape out of the cartridge.

Bar 218 is coupled to an extension 220 which normally engages a cam 222 carried on a rigid member 224, one end of which is pivotally connected by a pin 226 to second control lever 124 (FIGS. 2 and 9). A pair of second cams 228 are carried on member 224 on opposite sides of cam 222. Cams 228 are normally in engagement with corresponding cams 230 secured to base plate 24 in any suitable manner.

Cam 222 operates to pivot bar 218 when it is desired to stop the tape such as after a rewind or fast forward condition. For instance, assuming that shaft 126 has been moved to the left in the lower part of slot 128 (FIG. 1), member 224 will be in the position shown in FIG. 9a after having been in the position shown in FIG. 9. Spring 232 will bias member 224 so that cams 228 will move to the left of corresponding cams 230. Thus, extension 220 will be at the right side of cam 222 during the rewind operation. However, when it is desired to stop the rewind operation, knob 130 (FIG. 1) is moved to the right in the lower part of slot 128 and returned to the center lowermost part of the slot; when this occurs, member 224 will move in the direction of arrow 234 under the influence of control lever 124 so that cam 222 will engage extension 220 and pivot bar 218 in a counterclockwise sense when viewing FIG. 9*b*. This will cause brake unit 62 to rotate in the same direction so that a braking surface 236 adjacent to surface 210 (FIG. 1) will move into frictional engagement with the outer peripheries of flanges 46 and 48 to thereby stop the reel rotation.

Conversely, if a fast forward condition is desired, member 224 will be moved in the opposite direction from that shown in FIG. 9*a* so that, upon return of the member to the position shown in FIG. 9, it will rotate bar 218 in a clockwise sense. This will cause brake unit 62 to rotate in the same direction and cause a third braking surface 238 (FIG. 1) on the brake unit to move into frictional engagement with the outer peripheries of flanges 46 and 48 to thereby stop the rotation of the reels.

To advance tape 16 past the rotary head assembly, capstan 140 engages a cylindrical member 240 (FIG. 1 and 7) which is rigidly coupled to guide 82 for rotation therewith. Thus, as the capstan rotates, guide 82 causes tape 16 to advance in a predetermined direction. For instance, tape 16 advances from left to right when viewing FIG. 1 during a record or playback operation.

In operation, cartridge 18 is moved onto base plate 24 and releasably coupled thereto by spring holding members 214 (FIG. 1). Initially, arms 84 and 86 are in their dashed line positions so that pick-up elements or guides 80 and 82 will be in position to enter recesses 76 and 78 of the cartridge when the latter is placed on the base plate.

Motors 26 and 150 are set into operation and rotor 15 is caused to rotate by motor 26. Capstan 140 is caused to rotate by motor 150.

To initiate movement of the tape out of the cartridge and adjacent to the rotary head assembly, knob 130 is moved upwardly with respect to slot 128 so that levers 122 and 124 cause spur gear 116 to move into meshing relationship with ring gear 114. This causes disk 106 to rotate a half revolution until roller 156 is received in recess 154 of the disk. During this rotation, arms 84 and 86 move into the full line positions of FIG. 1 from the dashed line positions thereof, thereby moving tape stretch 32 out of the cartridge and about a portion of the rotor head assembly. Guide system 20 automatically orients the tape in the manner described above so that the tape will be presented at helix angle 184 to the rotary head assembly.

As the tape moves into the operative position near the head, capstan 140 engages member 240 to cause movement of the tape in a predetermined direction. Simultaneously, the heads will scan the tape, during a record mode, and video information can be recorded on the tape and, during a playback mode, video information on the tape can be sensed by the heads. Suitable circuitry (not shown) is provided with transport system 10 to effect record and playback of such video information.

When it is desired to return the tape to the cartridge, knob 130 is moved upwardly in slot 128, whereupon disk 106 is allowed to rotate through a half revolution until roller 156 is received in recess 152. Then, shaft 126 on the lower end of control lever 124 will be at the bottom of the slot and can move to the left for a rewind operation or to the right for a fast-forward position. To stop the tape after either one of these conditions, brake unit 62 will engage the outer peripheries of reel flanges 46 and 48 in the manner described above with respect to FIGS. 9, **9*a* and 9*b***.

After a record or playback operation, the cartridge can be removed and stored or it can be reused or replaced by another cartridge. Generally, the tape will be rewound in the cartridge before the latter is removed from the base plate.

The arrangement of the guides of guide system 20 will hereinafter be set forth with respect to certain parameters which are selected and which govern the amount of information capable of being recorded on or played back from the tape with tape transport 10. Among these parameters are the following:

| | |
|---|---|
| width of tape | .500 in. |
| speed of rotor **15** | 1200 rpm |
| diameter of rotor **15** | 7.000 in. |
| tape linear speed | 4.810 in./sec. |
| video track height | .400 in. |
| video head gap length | .0080 in. |
| video-to-audio guard band | .0050 in. |
| helix angle | –2.8259 ° |
| head-to-tape speed | 445.105 in./sec. |
| video track angle | 2.795 ° |
| video track length | 8.252 in. |
| video guard band | .0031 in. |
| tape wrap angle | 132.027 ° |
| angle between heads **12** and **13** | 121.0798 ° |
| angle between heads **13** and **14** | 121.5419 ° |
| angle between heads **14** and **12** | 117.3783 ° |
| head **12** elevation | .000 in. |
| head **13** elevation | –.0039 in. |
| head **14** elevation | –.0079 in. |

For the foregoing parameters, the following table indicates the relative positions of the various guides with respect to an X-Y coordinate system having the plus-minus conventions indicated in FIG. 4, with the dimensions being in inches:

| GUIDE | X | Y |
|---|---|---|
| **80** | –3.9026 | .9166 |
| **82** | 3.9026 | .9166 |
| **180** | –3.883 | 2.425 |
| **200** | 3.883 | 2.425 |
| **192** | –3.875 | 4.594 |
| **202** | 3.875 | 4.594 |
| **58** (Proj. **50**) | –3.750 | 5.250 |
| **58** (Proj. **51**) | 3.750 | 5.250 |
| **56** (Proj. **50**) | –3.875 | 6.000 |
| **56** (Proj. **51**) | 3.875 | 6.000 |

Various other parameters, specifically dimensions between adjacent guides and the distances away from the base plate at which the center line of the tape passes the guides, can be given to establish the correlation between the rotary head assembly, the guide system and the cartridge. Using the outer surface of the base plate as the datum or the zero height or position, the tape center line contacts the guides at the following heights or distances away from base plate 24, distances being given in inches:

| Guide | Height (inches) |
|---|---|
| **58** (Proj. **50**) | 1.8375 |
| **192** | 1.818 |
| **180** | 1.6581 |
| **80** | 1.7328 |
| **82** | 1.2670 |
| **200** | 1.3241 |
| **202** | 1.1767 |
| **58** (Proj. **51**) | 1.1562 |

With the foregoing dimensions, the height of the center line of the tape from the datum centrally between guides 80 and 82 is 1.500 inches. Guides 58A and 58B have a diameter of one-half inch. Both of these guides are tilted 4.91° from the vertical and to the right when viewing FIG. 4. Guides 80 and 82 have a diameter of 0.875 inches. Guide 80 is fixed while guide 82 rotates about its axis.

Guide 192 has a taper of 0.0916 inches/inch and has a diameter of 0.3125 inches at the location where the center line of the tape passes the guide. Guide 180 has a taper of 0.3789 inches/inch and has a diameter of 0.375 inches at the location where the tape center line passes the guide.

Guide 200 has a taper of 0.3027 inches/inch and the tape center line engages the same where its diameter is 0.375 inches. Guide 202 has a taper of 0.0838 inches/inch and the tape center line engages it at a location where the diameter is 0.3125 inches.

When the tape stretch is in the cartridge, it makes an angle of 4.91° as it extends between guides 58. The straight line distance between each guide 58 and the center line of the cartridge between the guides is 3.750 inches.

I claim:

1. In a tape transport system of the type having a rotary head assembly and tape supply and take-up means providing a laterally shiftable stretch of tape spaced from the assembly, a tape guide system comprising: a base plate adapted to support the assembly and the tape supply and take-up means in spaced relationship to each other; a pair of canted tape pick-up elements; means on the base plate for mounting the canted pick-up elements thereon for movement between respective first positions behind one side of the tape stretch and respective second positions adjacent to said head assembly with the tape pick-up elements being operable to pull the tape stretch toward the head assembly and to position the same helically along a portion of the paths of travel of the heads of the assembly, whereby the heads can scan the tape stretch adjacent thereto; driving means coupled with said mounting means for selectively moving the tape pick-up elements from the first positions to the second positions and return; and an auxiliary guide for each tape pick-up element, respectively, the auxiliary guides being operable to twist the tape as it extends between the tape supply and take-up means and the respective tape pick-up elements to cause the tangential tape portions at each tape pick-up element to align.

2. A tape guide system as set forth in claim 1, wherein said auxiliary guides are swingably mounted on said mounting means and are movable into respective operative locations as a function of the movement of the first guides into said second positions.

3. A tape guide system as set forth in claim 2, wherein each auxiliary guide has a conical tape-engaging surface, the tape stretch being partially looped about each tape pick-up element when the latter is in its second position, the conical surface of one auxiliary guide being disposed with its apex down on the supply side, the other auxiliary guide being disposed with its apex up on the take-up side.

4. A system as set forth in claim 3, wherein is provided a tape cartridge having a pair of axially aligned reels disposed at respective distances from said base plate, said tape stretch being coupled to the reels and extending outwardly therefrom, and second auxiliary guides disposed on the base plate to direct the tape from and into the cartridge and onto respective reels when the cartridge is in an operative location adjacent to the base plate and when the tape pick-up elements are in their second positions.

5. A system as set forth in claim 4, wherein said moving means includes a rotatable member coupled with said mounting means for moving the same and thereby said tape pick-up elements relative to said base plate, and means coupled with the member for rotating the same through a predetermined arc corresponding to the distance of travel of said take pick-up elements between respective first and second positions.

6. A system as set forth in claim 5, wherein is included means coupled with said rotatable member for stopping the rotation of the latter after the tape pick-up elements are in their second positions.

7. In a video reproducer and/or recording system of the type including a mount in which multiple transducers are rotatably mounted relative to a base plate and which utilizes a video cartridge presenting a continuous stretch of magnetic tape, said stretch having a supply end and a return end, a tape guide apparatus for selectively withdrawing said stretch of tape from said cartridge and helically wrapping a portion of it about a part of said mount or permitting said stretch to return to said cartridge, comprising the combination of:

a pair of arms swingable from retracted positions behind said stretch to advanced positions adjacent said mount, a pair of tape pick-up elements secured to said arms and positioned to pick up said stretch and helically to wrap said portion thereof about said mount as said arms move from their retracted to their advanced positions, a first pair of auxiliary tape guides, of which one has a conical surface with a downwardly extending apex, relative to the base plate, and the other has a conical surface with an upwardly extending apex, means for individually swingably mounting the first auxiliary guides into operative positions such that each outer tangential portion of tape at each pick-up element is aligned with its respective inner tangential portion of tape when said arms are advanced, and second auxiliary guides, one of said second auxiliary guides having a conical surface with an upwardly extending apex and the other of said second auxiliary guides having a conical surface with a downwardly extending apex, said second auxiliary guide being so positioned on said base plate that one end of the stretch is lowered and the other end of the stretch is lifted in order to transform the angle of inclination of the presented tape span into the helical angle of the wrap.

8. In a video reproducer and/or recording system of the type including a mount in which multiple transducers are rotatably mounted relative to a base plate and which utilizes a reel-over-reel video cartridge presenting a continuous inclined stretch of magnetic tape, said stretch having a relatively high supply end and a relatively low return end, a tape guide apparatus for selectively withdrawing said stretch of tape from said cartridge and helically wrapping a portion of it about a part of said mount or permitting said stretch to return to said cartridge, comprising the combination of:

a pair of arms swingable from retracted positions behind said stretch to advanced positions adjacent said mount, a pair of tape pick-up elements secured to said arms and positioned and inclined to pick up said stretch and helically to wrap said portion thereof about said mount as said arms move from their retracted to their advanced positions, a first pair of auxiliary tape guides, of which one is positioned on the tape supply side and has a conical surface with a downwardly extending apex, relative to the base plate, and the other is positioned on the tape return side and has a conical surface with an upwardly extending apex, means for individually swingably mounting the first auxiliary guides into operative positions in contact with the tape such that each outer tangential portion of tape at each pick-up element is aligned with its respective inner tangential portion of tape when said arms are advanced, and a second pair of auxiliary guides, one of said second auxiliary guides being positioned on the tape supply side and having a conical surface with an upwardly extending apex and the other of said second auxiliary guides being positioned on the tape return side and having a conical surface with a downwardly extending apex, said second auxiliary guides being so positioned on the base plate that tape departing from the supply end of the stretch is lowered and tape entering the return end of the stretch is lifted in order to transform the angle of inclination of the presented tape span into the helical angle of the wrap.

9. In a video reproducer and/or recording system of the type including a mount in which multiple transducers are rotatably mounted relative to a base plate and which utilizes a reel-over-reel video cartridge presenting a continuous inclined stretch of magnetic tape, said stretch having a relatively high supply end and a relatively low return end, a tape guide apparatus for selectively withdrawing said stretch of tape from said cartridge and helically wrapping a portion of it about a part of said mount facing the cartridge or permitting said stretch to return to said cartridge, comprising the combination of:

a pair of arms mounted on the base plate and swingable from retracted positions to advanced positions adjacent said mount, a pair of tape pick-up elements secured to said arms and positioned and inclined to pick up said stretch and helically to wrap said portion thereof about a portion of said mount facing the cartridge as said arms moved from their retracted to their advanced positions, a first pair of auxiliary tape guides, of which one is positioned on the tape supply side and has a conical surface with a downwardly extending apex, relative to the base plate, and the other is positioned on the tape return side and has a conical surface with an upwardly extending apex, means for individually swingably mounting the first auxiliary tape guides into operative positions in contact with the tape such that each outer tangential portion of tape at each pick-up element is aligned in coplanar relationship to and in substantial parallelism to its respective inner tangential portion of tape when said arms are advanced, and a second pair of auxiliary tape guides mounted on said base plate, one of said second auxiliary guides being positioned on the tape supply side and having a conical surface with an upwardly extending apex and the other of said second auxiliary guides being positioned on the tape return side and having a conical surface with a downwardly extending apex, said second auxiliary guides being so positioned on the base plate that tape departing from the supply end of the cartridge is lowered and tape descends to enter the return end of the cartridge.

10. In a video reproducer and/or recording system the combination in accordance with claim 9 in which the means for individually swingably mounting the first auxiliary tape guides into operative positions comprises individual linkages, each linkage consisting of a first link, pivoted to one of said arms and carrying a first auxiliary tape guide, and a second link having ends separately pivotally secured to the base plate and to the first link.

* * * * *